(12) United States Patent
Grgic et al.

(10) Patent No.: US 9,841,736 B2
(45) Date of Patent: *Dec. 12, 2017

(54) SECURITY, SAFETY, AND REDUNDANCY EMPLOYING CONTROLLER ENGINE INSTANCES

(71) Applicant: Rockwell Automation Technologies, Inc., Mayfield Heights, OH (US)

(72) Inventors: Richard J. Grgic, Painsville, OH (US); Subbian Govindaraj, Solon, OH (US); Kenwood H. Hall, Hudson, OH (US); Robert J. Kretschmann, Bay Village, OH (US); Charles M. Rischar, Chardon, OH (US); Raymond J. Staron, Chagrin Falls, OH (US); David A. Vasko, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 445 days.

This patent is subject to a terminal disclaimer.

(21) Appl. No.: 14/503,699

(22) Filed: Oct. 1, 2014

(65) Prior Publication Data

US 2015/0018983 A1 Jan. 15, 2015

Related U.S. Application Data

(63) Continuation of application No. 11/745,023, filed on May 7, 2007, now Pat. No. 8,856,522, which is a
(Continued)

(51) Int. Cl.
*H04L 29/06* (2006.01)
*G05B 9/03* (2006.01)
(Continued)

(52) U.S. Cl.
CPC ............ *G05B 9/03* (2013.01); *G05B 19/048* (2013.01); *G06F 21/6236* (2013.01); *G06F 21/74* (2013.01); *G05B 2219/14136* (2013.01)

(58) Field of Classification Search
None
See application file for complete search history.

(56) References Cited

U.S. PATENT DOCUMENTS 4,141,066 A 2/1979 Keiles
5,142,469 A 8/1992 Weisenborn
(Continued)

OTHER PUBLICATIONS

Office Action mailed Feb. 25, 2009 for U.S. Appl. No. 11/686,406, 29 pages.
(Continued)

*Primary Examiner* — Brandon Hoffman
(74) *Attorney, Agent, or Firm* — Amin, Turocy & Watson, LLP

(57) ABSTRACT

The claimed subject matter provides a system and/or method that facilitates employing safety within an industrial environment. An enhancing component can implement at least one of a security level, authentication, authorization, or an access right to a validated action to at least one of the controller or the controller engine instance. The enhancing component can further separate two or more entities within the industrial environment, the first entity related to process control and the second entity related to process safety. Additionally, the enhancing component can employ at least one of a backup controller or a backup controller engine instance in the event of at least one of a software error or a hardware error within the industrial environment.

20 Claims, 12 Drawing Sheets

Related U.S. Application Data continuation-in-part of application No. 11/679,380, filed on Feb. 27, 2007, now Pat. No. 7,778,713, and a continuation-in-part of application No. 11/679,394, filed on Feb. 27, 2007, now Pat. No. 7,684,876.

(51) Int. Cl.

| | | |
|---|---|---|
| G06F 21/62 | (2013.01) | |
| G05B 19/048 | (2006.01) | |
| G06F 21/74 | (2013.01) | |

(56) References Cited

U.S. PATENT DOCUMENTS

| | | |
|---|---|---|
| 5,796,603 A | 8/1998 | Hodorowski |
| 5,826,244 A | 10/1998 | Huberman |
| 5,875,461 A | 2/1999 | Lindholm |
| 5,887,029 A | 3/1999 | Husted et al. |
| 5,949,674 A | 9/1999 | Song et al. |
| 5,970,243 A | 10/1999 | Klein et al. |
| 5,971,581 A | 10/1999 | Gretta et al. |
| 6,055,370 A | 4/2000 | Brown et al. |
| 6,268,853 B1 | 7/2001 | Hoskins et al. |
| 6,338,130 B1 | 1/2002 | Sinibaldi et al. |
| 6,373,836 B1 | 4/2002 | Deryugin et al. |
| 6,453,460 B1 | 9/2002 | Keyes |
| 6,615,092 B2 | 9/2003 | Bickely et al. |
| 6,701,463 B1 | 3/2004 | Toeller |
| 6,735,764 B2 | 5/2004 | Nakai |
| 6,816,746 B2 | 11/2004 | Bickley et al. |
| 6,882,890 B2 | 4/2005 | Horn et al. |
| 6,901,446 B2 | 5/2005 | Chellis et al. |
| 6,922,681 B2 | 7/2005 | Fromherz et al. |
| 6,947,798 B2 | 9/2005 | Bronikowski et al. |
| 7,039,740 B2 | 5/2006 | Glasco et al. |
| 7,065,714 B1 | 6/2006 | Theel et al. |
| 7,111,306 B1 | 9/2006 | Laemmle et al. |
| 7,139,618 B2 | 11/2006 | Danz et al. |
| 7,257,620 B2 | 8/2007 | Lo |
| 7,272,815 B1 | 9/2007 | Eldridge et al. |
| 7,356,372 B1 | 4/2008 | Duncan et al. |
| 7,374,524 B2 | 5/2008 | McCormick |
| 7,472,387 B2 | 12/2008 | Nakano |
| 2002/0129085 A1 | 9/2002 | Kubala et al. |
| 2002/0194417 A1 | 12/2002 | Suzuki et al. |
| 2002/0199123 A1* | 12/2002 | McIntyre ............ G06F 21/6218 726/3 |
| 2003/0163508 A1 | 8/2003 | Goodman |
| 2004/0117535 A1 | 6/2004 | Schaftlein |
| 2004/0153171 A1 | 8/2004 | Brandt et al. |
| 2004/0230328 A1 | 11/2004 | Armstrong et al. |
| 2004/0260408 A1 | 12/2004 | Scott et al. |
| 2005/0015625 A1 | 1/2005 | Inoue et al. |
| 2005/0024102 A1 | 2/2005 | Kondo |
| 2005/0028137 A1 | 2/2005 | Evans et al. |
| 2005/0202808 A1 | 9/2005 | Fishman et al. |
| 2006/0005171 A1 | 1/2006 | Ellison |
| 2006/0041328 A1 | 2/2006 | McCormick |
| 2006/0092861 A1 | 5/2006 | Corday et al. |
| 2006/0107264 A1 | 5/2006 | Schmidt et al. |
| 2006/0150174 A1 | 7/2006 | Abe et al. |
| 2006/0178757 A1 | 8/2006 | Grgic et al. |
| 2006/0200257 A1 | 9/2006 | Kirste et al. |
| 2006/0224811 A1* | 10/2006 | Sichner .............. G05B 19/0428 710/306 |
| 2007/0044066 A1 | 2/2007 | Meijer et al. |
| 2007/0055777 A1 | 3/2007 | Lawrence et al. |
| 2007/0173959 A1 | 7/2007 | Chandhoke |
| 2007/0233870 A1 | 10/2007 | Goto et al. |
| 2008/0066019 A1 | 3/2008 | Worek et al. |
| 2008/0090586 A1 | 4/2008 | Engelhart |
| 2008/0109471 A1 | 5/2008 | Subbian et al. |
| 2008/0125877 A1 | 5/2008 | Miller et al. |

OTHER PUBLICATIONS

Office Action mailed Mar. 20, 2009 for U.S. Appl. No. 11/679,394, 37 pages.
Office Action mailed Mar. 9, 2009 for U.S. Appl. No. 11/695,758, 33 pages.
Office Action mailed Mar. 19, 2009 for U.S. Appl. No. 11/733,357, 34 pages.
Office Action mailed Mar. 20, 2009 for U.S. Appl. No. 11/679,380, 41 pages.
Office Action dated Apr. 1, 2009 for U.S. Appl. No. 11/738,787, 32 pages.
Office Action dated Mar. 20, 2009 for U.S. Appl. No. 11/733,390, 35 pages.
Office Action dated Oct. 7, 2009 for US Application U.S. Appl. No. 11/679,380, 38 pages.
Foley. "Modify MicroLogix Online." Feb. 2006, A-B Journal, vol. 13, No. 1, abstract, pp. 1-2.
Office Action dated Aug. 20, 2009 for U.S. Appl. No. 11/686,406, 31 pages.
Office Action dated Oct. 19 2009 for U.S. Appl. No. 11/695,758, 32 pages.
Johnson, et al. "OS Partitioning for Embedded Systems" Feb. 2, 2006; QNX Software Systems, pp. 1-9.
Johnson. Lowering the Development Costs of Industrial Control Systems through Software Partitioning. Aug. 15, 2006; QNX Software Systems, pp. 1-9.
Office Action dated Aug. 18, 2009 for U.S. Appl. No. 11/738,784, 38 pages.
Office Action dated Oct. 2, 2009 for U.S. Appl. No. 11/738,787, 22 pages.
Office Action dated Oct. 19, 2009 for U.S. Appl. No. 11/733,357, 38 pages.
Office Action dated Oct. 16, 2009 for U.S. Appl. No. 11/733,390, 41 pages.
Office Action dated Feb. 22, 2010 for U.S. Appl. No. 11/738,787, 35 pages.
Office Action dated Feb. 23, 2010 for U.S. Appl. No. 11/738,784, 35 pages.
Office Action dated Apr. 14, 2010 for U.S. Appl. No. 11/733,390, 67 pages.
Office Action dated Jun. 3, 2010 for U.S. Appl. No. 11/695,758, 54 pages.
Office Action dated May 24, 2010 for U.S. Appl. No. 11/695,727, 37 pages.
Notice of Allowance dated Oct. 20, 2010 for U.S. Appl. No. 11/733,390, 41 pages.
Hardin, Davis S; "Crafting a JAVA Virtual Machin in Silicon"; Mar. 2001; IEEE Xplore; IEEE Instrumatation & Measurement Magazine; pp. 54-56.
Hassapis, George; "Sift-testing of industrial control systems programmed in IEC 1131-3 languages"; 2000; ISA Transactions vol. 39 pp. 345-355.
Notice of Allowance dated Sep. 7, 2010 for U.S. Appl. No. 11/738,784, 20 pages.
Notice of Allowance dated Aug. 9, 2010 for U.S. Appl. No. 11/738,787, 21 pages.
Office Action dated Jun. 24, 2010 for U.S. Appl. No. 11/745,023, 51 pages.
Office Action dated Jan. 7, 2011 for U.S. Appl. No. 11/745,023, 33 pages.
Office Action dated Dec. 21, 2012 for U.S. Appl. No. 11/745,023, 29 pages.
Office Action dated Jul. 23, 2013 for U.S. Appl. No. 11/745,023, 34 pages.
Office Action dated Dec. 18, 2013 for U.S. Appl. No. 11/745,023, 25 pages.

\* cited by examiner

SECURITY, SAFETY, AND REDUNDANCY EMPLOYING CONTROLLER ENGINE INSTANCES

CROSS REFERENCE TO RELATED APPLICATION(S)

This application is a continuation of, and claims priority to, U.S. patent application Ser. No. 11/745,023, filed on May 7, 2007, and entitled "SECURITY, SAFETY, AND REDUNDANCY EMPLOYING CONTROLLER ENGINE INSTANCES" (issued as U.S. Pat. No. 8,856,522 on Oct. 7, 2014), which is a continuation-in-part of U.S. patent application Ser. No. 11/679,380 filed on Feb. 27, 2007, and entitled "CONSTRUCTION OF AN INDUSTRIAL CONTROL SYSTEM USING MULTIPLE INSTANCES OF INDUSTRIAL CONTROL ENGINES" (issued as U.S. Pat. No. 7,778,713 on Aug. 17, 2010) and U.S. patent application Ser. No. 11/679,394 filed on Feb. 27, 2007, entitled "DYNAMIC LOAD BALANCING USING VIRTUAL CONTROLLER INSTANCES" (issued as U.S. Pat. No. 7,684,876 on Mar. 23, 2010). The respective entireties of these related applications are incorporated herein by reference

TECHNICAL FIELD

The claimed subject matter relates generally to hardware controllers within an industrial automation environment and, more particularly, to optimize the execution of such hardware controllers.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers have been largely unchanged. In more detail, industrial controllers have been designed to efficiently undertake real-time control. For instance, conventional industrial controllers receive data from sensors and, based upon the received data, control an actuator, drive, or the like. These controllers recognize a source and/or destination of the data by way of a symbol and/or address associated with source and/or destination. More particularly, industrial controllers include communications ports and/or adaptors, and sensors, actuators, drives, and the like are communicatively coupled to such ports/adaptors. Thus, a controller can recognize device identity when data is received and further deliver control data to an appropriate device.

Unfortunately, traditional controllers employed within automation industrial environments have fallen behind recent technological advances to which the automation industry has maintained stride for stride. Conventional controllers are rigid and inflexible such that hardware and/or software associated therewith must be specifically tailored to a particular control engine and a one-to-one ratio between controllers and control engines must be maintained. Moreover, with the vast number of controllers and/or control engines within industrial environments, ensuring data integrity and providing sufficient safeguards for industrial environments can be a difficult and continuous task. Additionally, conventional techniques and/or mechanisms for protecting devices, controllers, applications, software, components, control engines, processes, and the like tend to be restrictive since control and safety aspects are typically commingled and dependent upon one another.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation relates to systems and/or methods that facilitate employing safeguards related to an industrial environment to ensure data integrity and reliability. An enhancing component can employ safety techniques and/or mechanisms to at least one of a controller, a controller engine instance, and/or an industrial environment. In particular, the enhancing component can implement granular security to the industrial environment such that each controller engine instance can include a corresponding security level with distinct rights/privileges. For example, the industrial environment can be organized based on a particular characteristic, wherein each of the segments/partitions can include a specific security right and/or level associated therewith.

In another aspect in accordance with the subject innovation, the enhancing component can separate control-based entities from safety-based entities. Thus, a distinct and succinct separation between control and safety can be employed by the enhancing component. The enhancing component can organize controller engine instances related to safety and ensure such instances are independent and separate from controller engine instances related to control. In still another aspect, the enhancing component can generate secondary (e.g., back-up) controller engine instances that can replicate existing controller engine instances for a fail-safe and/or back-up mechanism/technique. Thus, an existing controller engine instance can have a back-up controller engine instance that can seamlessly and dynamically replace the existing controller engine instance based upon an error. In other aspects of the claimed subject matter, methods are provided that facilitate employing safety measures to an industrial environment for security and fail-safe.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

Figure 1:
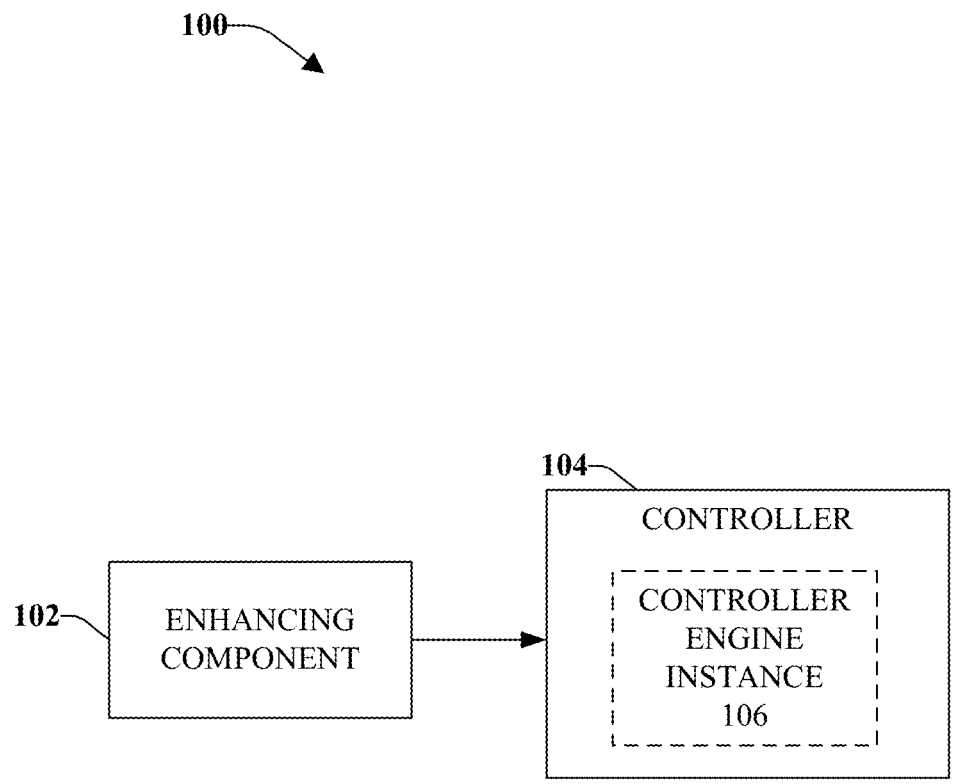
FIG. 1 illustrates a block diagram of an exemplary system that facilitates employing safeguards related to an industrial environment to ensure data integrity and reliability.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component," "controller," and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates a system 100 that facilitates employing safeguards related to an industrial environment to ensure data integrity and reliability. The system 100 can include an enhancing component 102 that can provide various protective layers/features and/or mechanisms in relation to an industrial environment and, in particular, a controller 104 with at least one controller engine instance 106 executing thereon. The controller 104 can utilize a real-time operating system to allow the controller engine instance 106 to execute in a process-like manner thereon (discussed in more detail infra). With the rapidly increasing possibility of threats and/or errors within an industrial environment, the enhancing component 102 can mitigate concerns related to such threats and/or errors. In general, the enhancing component 102 can employ at least one security technique associated with at least one of the controller 104, the controller engine instance 106, an industrial environment, and/or most any suitable combination thereof.

The following illustrates various terminology utilized throughout the subject innovation and it is to be appreciated that the terms security, safety and redundancy are defined within the context described herein (as well as the entire detailed description). Security can be associated with authentication, authorization, access rights to certain validated actions, etc. The enhancing component 102 can provide a portion of security (e.g., a security level) to a portion of a controller engine instance 106 and/or a partition and/or segment within an industrial environment. Safety can relate to ensuring that personnel and property are protected. For instance, to ensure safety, a voting scheme of parallel control paths can be utilized such that the control paths have to concur. In another example, a safety master can be a controller and a safety partner can be a second controller (e.g., a hardware based safety solution). The enhancing component 102 can ensure the separation of controllers and/or controller engine instances related to safety master and/or safety partner from controllers and/or controller engine instances associated with control (e.g., not safety related, safety partner control, safety master, etc.). Furthermore, the enhancing component 102 can separate two or more entities (e.g., controllers, processes, applications, controller engine instances, etc.) within the industrial environment, the first entity related to process control and the second entity related to process safety. Redundancy can be associated with ensuring continuous operation of the industrial environment (e.g., process, plant, etc.) through failures in components, wherein such failed components can have backup components for replacement. For operations as well, there can be a backup of a controller (e.g., hardware for hardware failures that incapacitate a controller) and/or controller engine instance (e.g., processes for software or application failures that incapacitate a controller engine instance). The enhancing component 102 can provide redundancy for an industrial environment such that a controller can include a backup controller and/or a controller engine instance can include a backup controller engine instance.

For example, the enhancing component 102 can implement at least one security level which can be respectively designated to a tier, partition, segregation, grouping, collection, etc. within an industrial environment. In other words, the enhancing component 102 can provide granular security to an industrial environment, the controller 104, and/or the controller engine instance 106. It is to be appreciated that the security level and/or rights/privileges can be associated with most any suitable grouping, partition, segregation, collection, etc. with an industrial environment, controllers, controller engine instances, processes, applications, devices, etc. For instance, an industrial environment can be hierarchically arranged based on a plurality of partitioning factors such as, but not limited to, program association, application relation, location, geography, batch process relation, hardware type, proximity, a user preference/priority, language, scale data, etc., wherein each can include a security level with specific rights/privileges. In another example, the enhancing component 102 can allocate security rights and privileges based upon the grouping and/or arrangement of control engine instances within an industrial environment. Thus, an environment can organize controller engine instances based upon priority/importance and the enhancing component 102 can implement a security level respective to each priority-based grouping. As discussed, security can be associated with authentication, authorization, access rights to certain validated actions, etc.

Furthermore, the enhancing component 102 can enforce separation between control and safety within an industrial environment. The enhancing component 102 can separate control-based entities (e.g., an entity associated with the industrial environment such as, but not limited to, a controller, a controller engine instance, a device, a portion of a process, a portion of an application, etc.) and safety-based entities within an industrial environment. By enforcing the separation/segregation of control and process, the industrial environment can be more secure and efficient. For instance, a first controller engine instance within a controller can be related to process control, while a second controller engine instance within the same controller can relate to safety. Thus, if the safety process shuts down, the basic control process can still execute without delay and/or complications. As discussed, safety can be related to ensuring that personnel and property are protected.

Moreover, the enhancing component 102 can implement a back-up and/or fail-safe mechanism to protect the industrial environment from errors, complications, etc. associated with the controller engine instance 106. Specifically, the enhancing component 102 can employ a redundancy technique which enables an existing controller engine instance to have a back-up controller engine instance (e.g., a secondary controller engine instance, a replicating controller engine instance, etc.) in case of an error and/or complication (e.g., a shutdown, an exception, a failure, a virus contamination, a defect, etc.) with the existing controller engine instance. In the event that an error and/or complication with the existing controller engine instance occurs, the back-up controller engine instance can be utilized in a seamless and dynamic manner. In other words, more than one controller instance can be implemented to provide redundancy in respect to an industrial environment. For example, a first controller instance can provide primary control for a component (e.g., hardware, software, and/or any combination thereof), while a second controller instance can provide back-up (e.g., secondary) control of the component which enables protection, safety, and redundancy in the scenario that the first controller instance shuts down and/or throws an exception/error. As discussed, redundancy can be associated with ensuring continuous operation of the industrial environment (e.g., process, plant, etc.) through failures in components, wherein such failed components can have backup components for replacement.

It is to be appreciated that the controller 104 can contain software components and hardware components having inputs and/or outputs that can be utilized in connection with automating an industrial manufacturing device/process. Moreover, it is to be appreciated and understood that the controller 104 can be most any suitable portion of hardware and/or portion of software that receives and/or transmits inputs and/or outputs in order to control at least one of a device or a portion of a process. It is to be noted that a controller (e.g., a programmable logic controller (PLC), etc.) can be a dedicated piece of hardware that is self contained or in the case of a "soft PLC" a piece of software that runs on a computer and provides PLC-like control. For instance, in the case of a soft PLC, the soft PLC can be partitioned to employ most any suitable soft PLC engine instances on a real time operating system (e.g., rather than a soft PLC controller executing on an operating system as non-real time), wherein each soft PLC engine instance can handle a portion of what the soft PLC engine handled, controlled, etc.

It is to be noted that the controller 104 can include various computer or network components such as servers, clients, communications modules, mobile computers, wireless components, control components and so forth that are capable of interacting across a network (not shown). Similarly, the term PLC or controller as used herein can include functionality that can be shared across multiple components, systems, and or networks. For example, one or more controllers 104 (e.g., PLCs, etc.) can communicate and cooperate with various network devices across a network. This can include substantially any type of control, communications module, computer, I/O device, sensor, Human Machine Interface (HMI)) that communicate via a network which includes control, automation, and/or public networks. The controller 104 can also communicate to and control various other devices such as Input/Output modules including Analog, Digital, Programmed/Intelligent I/O modules, other programmable controllers, communications modules, sensors, output devices, and the like.

A network can include public networks such as the Internet, Intranets, and automation networks such as Common Industrial Protocol (CIP) networks including DeviceNet, ControlNet and EtherNet/IP. Other networks include Ethernet, DH/DH+, Remote I/O, Fieldbus, Foundation Fieldbus, Modbus, Profibus, wireless networks, serial protocols, and so forth. In addition, the network devices can include various possibilities (e.g., hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

In another aspect in accordance with the subject innovation, the controller 104 can be implemented in the industrial automation environment (e.g., an industrial environment, an automation environment, an environment, an automation industry, etc.) which employs a hierarchical representation of devices and/or processes. The hierarchy can be based at least in part upon the physical location of devices/processes (e.g., a region of a factory can have several defined sub-regions, which in turn can comprise sub-regions), safety zones (e.g., IEC61508 safety integrity levels (SIL), en954 category, etc.) standards associated with industry, such as ISA S95, ISA S88, and the like, proprietary hierarchy that is provided by an enterprise, or any other suitable hierarchy (discussed in further detail in FIG. 10). It is to be appreciated that the controller software can be distributed as a component of a disparate application (e.g., a larger application). For instance, a controller component can be included on a welder (e.g., a robot welder, an automated welder, etc.), wherein the controller can execute within the context of the welder (e.g., executing within the context of the robot welder). Moreover, the proprietary standard can include customer defined hierarchies as well as industrial automation company defined hierarchies (e.g., a company can provide tools to which customers can define their own hierarchies).

Figure 2:
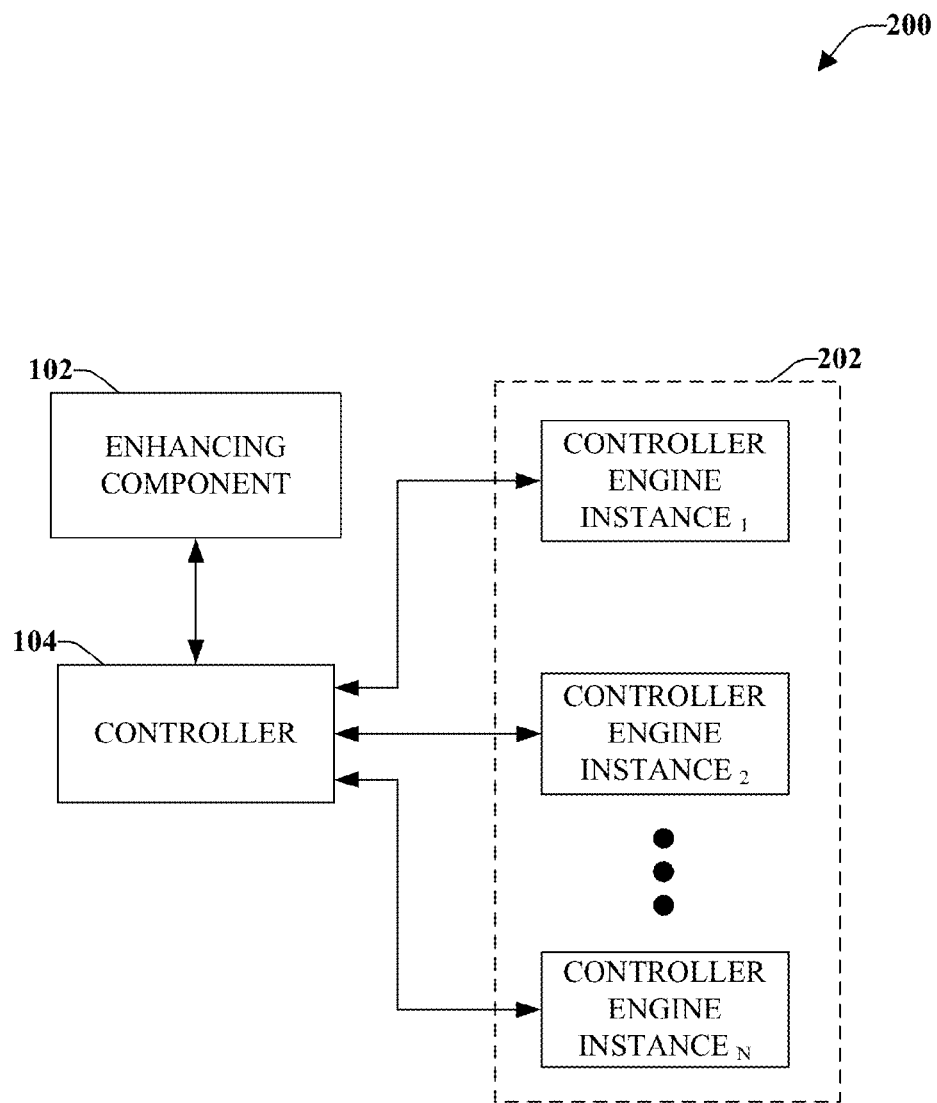
FIG. 2 illustrates a block diagram of an exemplary system that facilitates employing one or more controller engine instances related to a controller.

FIG. 2 illustrates a system 200 that facilitates employing one or more controller engine instances related to a controller. The system 200 can include the controller 104 that can generate at least one controller engine instance 202, wherein the controller engine instances 202 can execute on the controller 104 with a real time operating system (OS) to be utilized with automating/controlling an industrial manufacturing device and/or process. It is to be appreciated most any suitable operating system can be utilized by the subject innovation (e.g., a proprietary operating system, off-the-shelf, a third-party operating system, an open source operating system, a real time operating system (OS), etc.). The controller 104 can utilize most any suitable number of controller engine instances 202 such as controller engine instance$_1$ to controller engine instance$_N$, where N is a positive integer. In other words, the controller 104 can implement a plurality of controller engine instances 202, wherein each controller engine instance can handle controlling a device and/or portion of a process within an industrial automation environment. It is to be appreciated that the system 200 can enable the creation of a new instance of an engine based on a set of pre-defined parameters. In other words, no user intervention is needed to start a new instance of the engine.

For example, an industrial automation environment can include a controller that can be utilized with a first process, a second process, and a device. Conventionally, a controller and a controller engine are restricted to a one-to-one ratio such that there is only one controller engine per physical hardware controller. With such restrictions, additional hardware controllers needed to be introduced to enable multiple controller engines. However, the claimed subject matter implements a controller engine in a substantially similar manner to a process implemented on a hardware controller in the fact that multiple controller engines (e.g., controller engine instance) can execute on the hardware controller (e.g., multiple processes can execute on a controller). By executing multiple controller engine instances on the controller, each particular controller engine instance can handle at least a portion of a process and/or a device within the industrial automation environment. For instance, the controller can employ a controller engine instance to handle the first process, a controller engine instance to control the second process, and/or a controller engine instance to handle/control the device. It is to be appreciated that the controller can implement most any suitable number of controller engine instances. In another example, a first controller engine instance can be utilized for the first process and the second process while a disparate controller engine instance can be utilized for the device. In other words, the various number of controller engine instances can be managed to control, handle, and/or execute a device and/or process in most any suitable combination.

In another example, an industrial automation environment can include controller A, controller B, and controller C. In one scenario, controller engine instances can execute on a corresponding parent/host controller. However, there can be distributed controller engine instances (e.g., a controller engine instance with more than one host and/or parent controller) such that more than one controller can handle and/or host a controller engine instance. Thus, controller A and controller B can share the hosting duties for a controller engine instance. By sharing and/or distributing the execution of the controller engine instance to more than one controller, the full potential of controllers and respective controller engine instances can be reached.

In another example, a controller engine instance executing on a first controller can be seamlessly handed off to a disparate controller based upon a deterioration of the initial hosting controller (e.g., first controller). Furthermore, the controller engine instance can be shared and/or distributed to a disparate controller in light of a possible deterioration and/or problematic initial host controller. It is to be appreciated that the claimed subject matter is to include transferring, handing off, sharing, etc. of a controller engine instance to a disparate controller based on a particular event/circumstance (e.g., controller health, controller characteristic, restructure, update, security, upgrade, error, firmware, dependability, detail related to an industrial automation environment, etc.). It is to be appreciated that the system 200 can enable the creation of controller engine instances without user intervention. Thus, the creation and/or generation of the controller engine instances to execute on the real time operating system (OS) corresponding to the controller can be automatic and seamless.

As discussed, the enhancing component 102 can enable various safeguards, protective mechanisms, and the like to the industrial environment. In particular, the enhancing component 102 can allow granular security to at least one controller engine instance 202. For example, a controller can host a controller engine instance A and a controller engine instance B, where each controller engine instance can include respective and distinct security privileges, rights, configurations, settings, etc. In other words, the enhancing component 102 can provide security to the industrial environment dealing with authentication, authorization, access rights to certain validated actions, etc. Furthermore, the enhancing component 102 can enable separation of control and safety amongst controller engine instances 202. A portion of controller engine instances 202 can relate to safety (e.g., safety within an industrial environment, safety related to devices, safety control, safety applications, safety processes, etc.) and can be separated from a portion of controller engine instances 202 that relate to control (e.g., control within an industrial environment, device control, process control, application control, etc.). In other words, the enhancing component 102 can ensure that personnel and property are protected. Still further, the enhancing component 102 can implement multiple controller engine instances 202 for back-up for an industrial environment. In other words, the enhancing component 102 can provide and/or ensure redundancy is provided for the industrial environment. For example, primary controller engine instances can have a corresponding back-up controller engine instance that can be substantially similar in order to replace the primary controller engine instance upon error, complications, etc.

Figure 3:
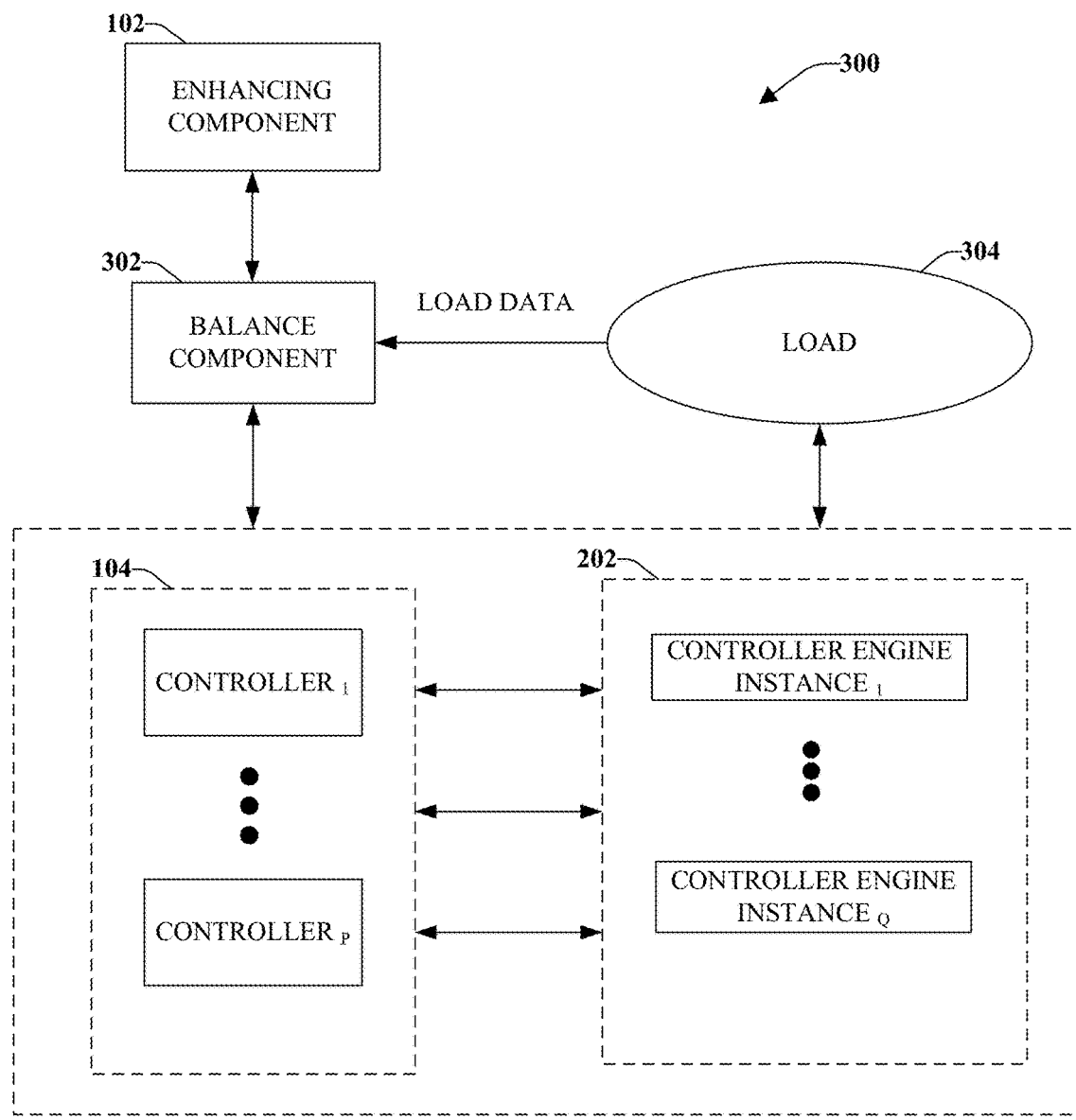
FIG. 3 illustrates a block diagram of an exemplary system that facilitates dynamically distributing a load amongst a plurality of controllers and/or a plurality of controller engine instances.

FIG. 3 illustrates a system 300 that facilitates dynamically distributing a load amongst a plurality of controllers and/or a plurality of controller engine instances. The system 300 can include a balance component 302 that can employ dynamic allocation of a portion of a load 304 to one or more controllers 104 and/or one or more controller engine instances 202 without user intervention. Generally, the balance component 302 can adjust a load assignment (e.g., load A is assigned to controller X, load B is assigned to controller Y, etc.) for controllers 104 (and respective controller engine instances 202) within an industrial automation environment without user intervention. Moreover, the balance component 302 can allow the distribution of most any suitable portion of the load 304 to most any suitable portion of the controllers 104 or most any suitable portion of controller engine instances 202. The examples and illustrations below associated with dynamic load distribution is intended to include distribution to a controller as well as distribution to a controller engine instance and the claimed subject matter is to include most any suitable combination of employing a controller and/or a controller engine instance.

For example, the load 304 can be partitioned into five (5) parts with five (5) controllers handling/controlling each part. In another example, the load 304 can be divided into four (4) pieces where a controller A can handle/control 2 pieces, controller B can handle/control 1 piece, and controller C can handle/control 1 piece. Still further, the load 304 can be divided into three (3) pieces where a host controller can include most any suitable number of controller engine instances that can handle/control the three (3) pieces accordingly (e.g., evenly distributed, percentage-based, processor-based percentage, resource availability-based, etc.). It is to be appreciated that the load 304 can be partitioned and/or distributed based on most any suitable manner such as, but not limited to, controller resources, controller engine instance resources, processor availability, processing capabilities, percentage based, functionality, importance, priority, security, safety, redundancy, integrity, reliability, location, source/origin, user preference, user-defined manner, relation to source code, etc. Furthermore, it is to be appreciated that the balance component 302 can distribute a portion of the load 304 to most any suitable number of controllers 104 such as controller$_1$ to controller$_P$, where P is a positive integer. Moreover, it is to be appreciated that the balance component 302 can distribute a portion of the load 304 to most any suitable number of controller engine instances 202 such as controller engine instance$_1$ to controller engine instance$_Q$, where Q is a positive integer regardless of the host controller (e.g., remote, local, resources, processing capabilities, etc.). Although a single balance component 302 is depicted, it is to be appreciated and understood that most any suitable number of balance components can be employed such that the balance component can be within each controller, a stand-alone component, and/or most any suitable combination thereof.

By evaluating at least one of the load 304 and/or the controllers 104, the balance component 302 can enable self-tuning and/or dynamic distribution which optimizes and enhances controllers within industrial automation environments. Controllers within industrial automation environments typically have various characteristics and/or capabilities in relation to computation and/or processing ability. By evaluating such characteristics and/or the load 304, the system 300 greatly improves traditional techniques and/or mechanisms associated with controllers. It is to be appreciated that the load 304 can be most any suitable load related to an industrial environment such as, but not limited to, control related to a portion of a device within the industrial environment, control related to a portion of a process within the industrial environment, receipt of data related to the industrial environment, transmission of data related to the industrial environment, most any suitable processing within the industrial environment, etc. For instance, the balance component 302 can monitor and/or track most any suitable characteristic associated with the capability of the controllers 104 such as, but not limited to, processing ability, hard drive, processor speed, memory, networking capabilities, version, edition, hardware age, processor type, controller brand, controller functionality, controller make, controller model, available resources, capacity available, accessibility, frequency of use, processor consumption, memory consumption, controller embedded software (e.g., firmware), etc.

Furthermore, it is to be appreciated that communication between most any suitable controllers (and/or controller engine instances 202) handling/controlling a portion of the load 304 can be employed. Thus, the controllers 104 and/or controller engine instances 202 can communicate to each other in relation to the distribution of the load 304 therewith. Moreover, it is to be understood that the communication can be among most any suitable controller and/or controller engine instance associated with the system 300 and the communication need not be between controllers sharing the load 304. Thus, a system can include controller A, controller B, and controller C such that a load is shared by controller A and controller B (e.g., no load on controller C, a disparate load on controller C, etc.). Controller C can communicate to controller A and/or controller B to notify of available processing resources/capabilities to which a portion of the load can then be shared by controller C. Furthermore, it is to be appreciated that the balance component 302 can receive such communications and re-distribute the allocation of the load 304 accordingly in real-time.

Additionally, the enhancing component 102 can implement a multitude of security measures/techniques associated with the system 300. The enhancing component 102 can initiate a security level with rights/privileges that correspond to a portion of the load 304. In addition, the enhancing component 102 can provide security, safety, and/or redundancy for the system 300. For instance, the balance component 302 can allocate a first portion of the load 304 with a first security level and a second portion of the load 304 with a second security level, wherein each security level can have distinct security rights/privileges. Moreover, the enhancing component 102 can further enable a separation between control and safety such that loads related to safety can be separated from loads related to control. For example, the balance component 302 can distribute a portion of safety load to a portion of controller engine instances 202 and a portion of control load to a portion of controller engine instances 202 based on an enforcement of control and safety separation employed by the enhancing component 102. The enhancing component 102 can further utilize a secondary controller engine instance to back-up an existing controller engine instance handling a portion of the load 304. In an example, the balance component 302 can distribute the load 304 to a controller engine instance A and a controller engine instance B, wherein the enhancing component 102 can utilize a back-up controller engine instance for the controller engine instance A and a back-up controller engine instance for the controller engine instance B. Thus, if a failure, error, complication, and the like occurs in connection with the controller engine instance A and/or controller engine instance B, the back-up controller(s) can be employed. It is to be appreciated that there can be most any suitable ratio of back-up controller engine instances to primary and/or exiting controller engine instances (e.g., one back-up controller engine instance for each existing controller engine instance, two back-up controller engine instances for each existing controller engine instances, one back-up controller engine instance for two existing controller engine instances, etc.).

Figure 4:
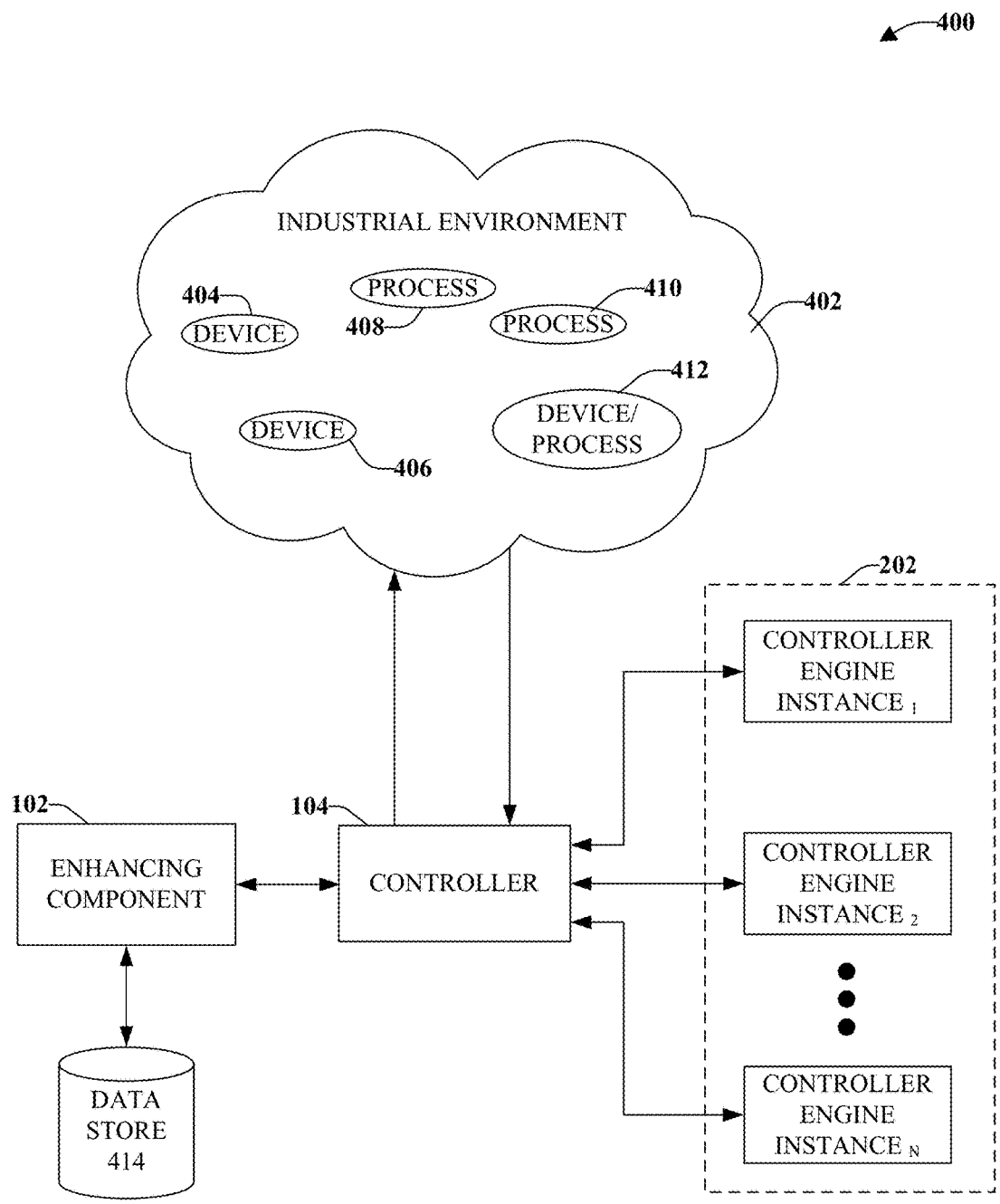
FIG. 4 illustrates a block diagram of an exemplary system that facilitates protecting an industrial environment utilizing controller engine instances.

FIG. 4 illustrates a system 400 that facilitates protecting an industrial environment utilizing controller engine instances. The enhancing component 102 can utilize various safeguards, protective mechanisms, and the like to an industrial environment 402. In particular, the enhancing component 102 can provide security (e.g., authentication, authorization, access rights to certain validated actions, etc.), safety (e.g., ensuring the protection of personnel and/or property, etc.), and/or redundancy (e.g., ensuring continuous operation of the industrial environment, etc.) for the industrial environment 402. In general, the industrial environment 402 can include a plurality of devices, processes, etc. For example, the industrial environment 402 can include most any suitable number of devices and/or process such as device 404, device 406, process 408, process 410, and/or device/process 412. It is to be appreciated that the devices and/or process within the industrial environment can be communicatively coupled to the system 400 by way of an intranet or other suitable network. Moreover, it is to be appreciated that the devices and/or processes within the network can communicate utilizing most any suitable technique (e.g., employing CIP but transmission of data can be accomplished using a technique not defined as a network). The device can be most any suitable device associated with an industrial automation environment such as, but not limited to, a physical device, a software device, an application, a virtual device, a PLC, a controller device, a furnace, a human machine interface (HMI), a computer, a disparate controller, a roller, a station, a welder, a scanner, a belt conveyor, a pump, a press, a fan, a heater, a switch, a sensor, a conveyor, a portion of firmware, a portion of an application, a portion of a process, a cooler, a valve, an electrical component, a drain, a photo eye, a robot, etc. Furthermore, the device and/or process can be controlled by the controller 104, at least one controller engine instance 202, a portion of a controller engine instance, and/or most any suitable combination thereof. It is to be appreciated that a controller can be executed as a component of a larger system can take part of the load sharing. For example, the controller can be executing as a component of the welder, wherein the controller may be capable of also interacting with the enhancing component 102.

It is to be appreciated that the system 400 can be utilized in a hierarchically structured industrial environment. For example, the devices/processes 404-412 can be hierarchically structured to facilitate management of such devices within the industrial environment 402. The hierarchy can be based at least in part upon the physical location of devices (e.g., a region of a factory can have several defined sub-regions, which in turn can comprise sub-regions), standards associated with industry, such as ISA S95, ISA S88, and the like, proprietary hierarchy that is provided by an enterprise, or any other suitable hierarchy. For instance, a top portion of the hierarchy may be a plant, and a sub-level of the plant may be programmable logic controllers utilized within the plant, and a sub-level of the programmable logic controllers can be devices controlled by such controllers (discussed in more detail in FIG. 10). It is understood that this is but one example of a hierarchy, and is for illustrative purposes only.

Moreover, the system 400 can include a data store 414 that can store most any suitable data related to the enhancing component 102, the controller 104, a controller engine instance 202, and/or most any suitable combination thereof. For example, the data store 414 can store security data, security rights, security privileges, security corresponding to a particular level, hierarchical security levels and corresponding portions of an industrial environment, control and safety separation data, separation settings, redundancy settings, existing controller engine instance data, back-up controller engine instance data, ratio data for existing controller engine instances and back-up controller engine instances, historic data related to the industrial environment, historic data related to controller engine instance, controller data, most any suitable data related to a controller and/or a controller engine instance, health data related to a controller, transfer data, distribution data, etc. The data store 414 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), MRAM, a combination of NV memory with the access speeds of volatile memory, and Rambus dynamic RAM (RDRAM). The data store 414 of the subject systems and methods is intended to comprise, without being limited to, these and any other suitable types of memory. In addition, it is to be appreciated that the data store 414 can be a server, a database, a hard drive, and the like.

Figure 5:
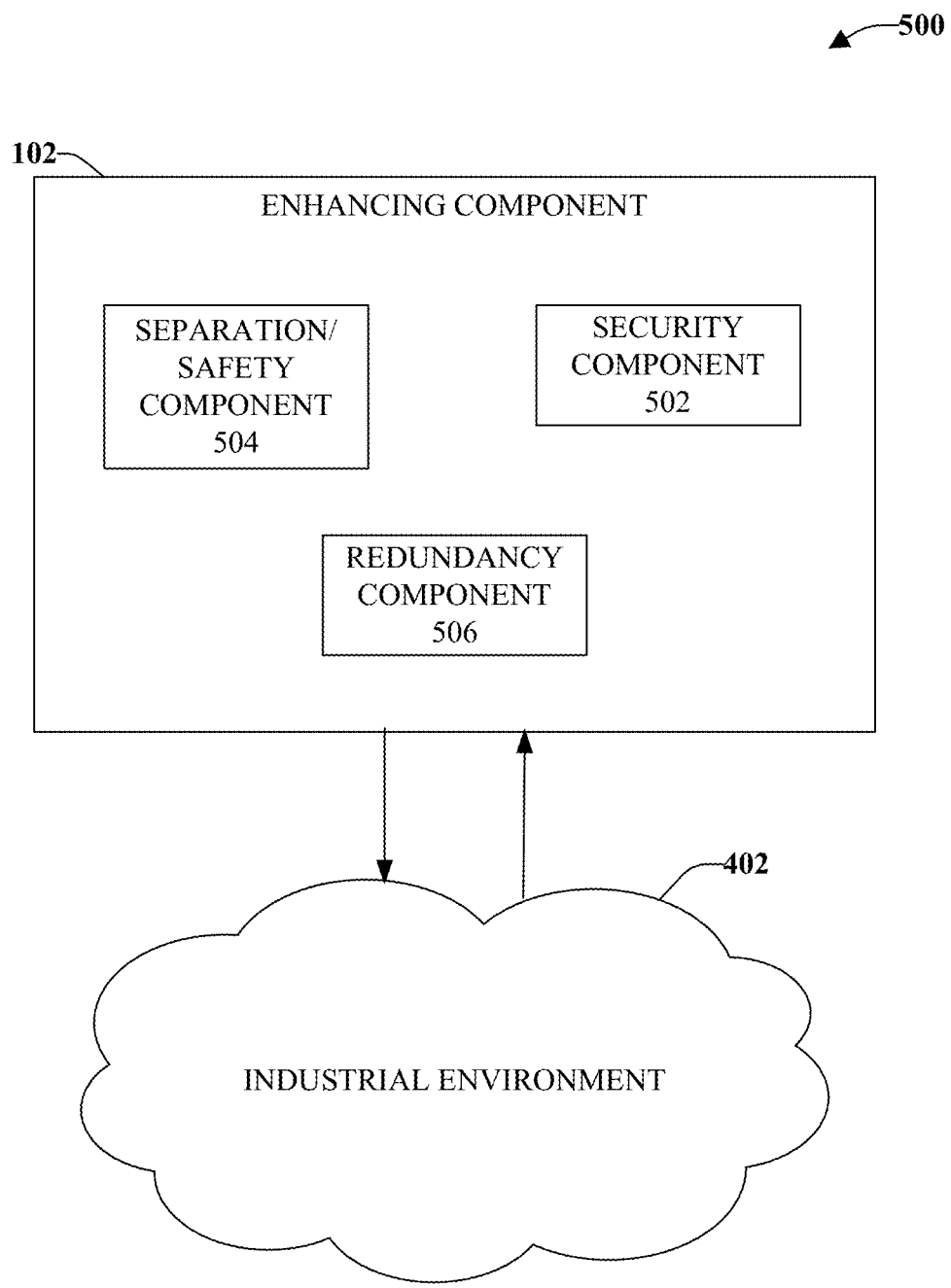
FIG. 5 illustrates a block diagram of an exemplary system that facilitates employing safety measures to an industrial environment for security and fail-safe.

FIG. 5 illustrates a system 500 that facilitates employing safety measures to an industrial environment for security and fail-safe. The system 500 illustrates various components that can be utilized with the subject innovation. It is to be appreciated that the components can be integrated into each other, stand-alone components, and/or most any suitable combination thereof. Moreover, it is to be appreciated that safety, security, and/or redundancy can be types of services that can be used together, independently, and/or any suitable combination thereof. Safety can relate to delivery integrity, wherein there can be an ability to deliver data as promised or indicate lack of delivery. In addition, redundancy can relate to availability, wherein there can be an ability to continue to operate if a fault exists and/or arises. Furthermore, security can relate to cryptographic integrity, wherein there can be an ability to protect against unintended data access or unintended disruption to operations. The enhancing component 102 can provide at least one of security, safety, and/or redundancy to the industrial environment 402 for enhancement and/or optimization. The system 500 can utilize a security component 502 that enables granular security for the industrial environment 402 and, in particular, controller engine instances. In general, the security component 502 can provide authentication, authorization, access rights to certain validated actions, etc. The security component 502 can define security, authorization, and/or privileges in accordance with at least one of a pre-defined hierarchy, security level, username, password, access rights, data importance (e.g., more important data correlates with high security clearance), etc. For instance, the security component 502 can assign a particular security level/clearance for a particular group of controller engine instances. Thus, a controller engine instance can be a first security level with distinct security authorizations and/or privileges, while a disparate controller engine instance can have a second security level with disparate security authorizations and/or privileges. In other words, the security component 502 can provide granular security and/or privileges in relation to segments, partitions, divisions, etc. of controller engine instances within the industrial environment 402. It is to be appreciated that there can be various levels of security with numerous characteristics associated with each level and that the subject innovation is not limited to the above examples.

The system 500 can further utilize a safety/separation component 504 that allows control-based controller engine instances and safety-based controller engine instances to be distinct and separate from one another. In general, the safety/separation component 504 can allow personnel and property to be protected. For example, a safety master can be a controller and a safety partner can be a second controller (e.g., a hardware based safety solution). The safety/separation component 504 can ensure the separation of controllers and/or controller engine instances related to safety master and/or safety partner from controllers and/or controller engine instances associated with control (e.g., not safety related, safety partner control, safety master, etc.). In other words, the safety/separation component 504 can ensure that safety-related processes, devices, controllers, controller engine instances, etc. can be isolated from control-related processes, devices, controllers, controller engine instances, etc. By segregating control and safety, the industrial environment can be greatly enhanced. For example, control-related entities can continue to operate and be unaffected regardless of minor safety-related entity failures/issues. The control-related controller engine instances can have dedicated and distinct execution space in comparison to process-related controller engine instances.

The system 500 can utilize a redundancy component 506 that can generate a back-up controller engine instance for an existing controller engine instance. In general, the redundancy component 506 provides redundancy for the industrial environment 402, wherein such redundancy ensures continuous operation of the industrial environment 402 (e.g., process, plant, etc.). For instance, the redundancy component 506 can employ a backup of a controller (e.g., hardware for hardware failures that incapacitate a controller) and/or controller engine instance (e.g., processes for software or application failures that incapacitate a controller engine instance). For example, the redundancy component 506 can evaluate the industrial environment 402 to create at least one back-up controller engine instance that can be utilized in the event an existing controller engine instance fails, throws an exception/error, etc. The redundancy component 506 can implement most any suitable back-up controller engine instance-to-existing controller engine instance ratio (e.g., one back-up to one existing, two back-ups to one existing, one back-up to three existing, etc.). Moreover, the back-up controller engine instance can be substantially similar to the existing controller engine instance that it is backing up. It is to be appreciated that the redundancy component 506 can create and/or generate the back-up controller engine instance at most any suitable time such as, but not limited to, prior to a failure of an existing controller engine instance, during the identification of a failure, after a failure cannot be corrected, etc.

Moreover, the enhancing component 102 can enable safety, security, and/or redundancy needs related to the industrial environment 402. For example, a controller engine instance within a controller can be utilized for redundancy and/or for safety aids for software backup. Thus, if a software failure occurs (e.g., a particular controller engine instance fails), a disparate controller engine instance can be utilized regardless of host controller. For hardware failures, a controller engine instance hosted by disparate controllers can be employed based at least in part upon the controller and respected controller engine instances being incapacitated. Typically for redundancy and safety, a one-to-one mapping can be employed. Yet, the subject innovation can enable a 1 to X mapping to be employed, where X is a positive integer. By employing the 1 to X mapping, various efficiencies can be employed such as having one controller (e.g., hardware controller) that can host the potential back-ups for controller engine instances on multiple controllers. It is to be appreciated that bandwidth can be less of an issue since the different controller engine instances that backup different controllers are ready and able to run but can wait for the opportunity or reason to run. Additionally, for diversity of voting in safety applications, a one-to-one hardware mapping can be utilized. By employing the subject innovation, multiple controller engine instances coupled with multi-core processors can natively run different operating systems which can allow safety diversity to be achieved with lower hardware costs (e.g., resources) but equal levels of safety.

Figure 6:
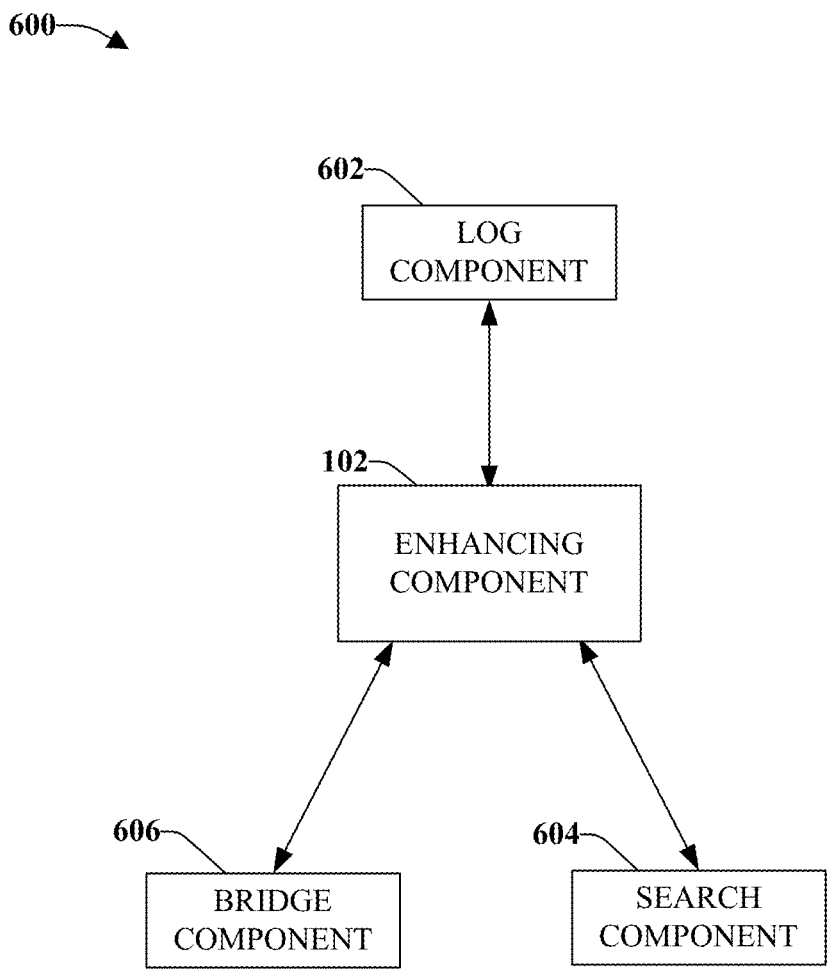
FIG. 6 illustrates a block diagram of an exemplary system that facilitates managing safeguards associated with an industrial environment.

FIG. 6 illustrates a system 600 that facilitates managing safeguards associated with an industrial environment. The system 600 can utilize a log component 602 that tracks data in accordance with the claimed subject matter. In particular, the log component 602 can track and/or monitor data related to security layers, security rights, security privileges, hierarchical right data, user data, authorization data, separation data, separation settings, back-up controller settings/configurations, segment/partition data, segment/partition membership data, user data related to the system 600, security data, hierarchy data, and/or most any suitable data related to the controller, controller engine instance, device, process, code, etc. It is to be appreciated that the log component 602 can be a stand-alone component, incorporated into the enhancing component 102, and/or any combination thereof. For example, if a user initiates a security level for first segment/partition including controller engine instance A and a security level for a second segment/partition including controller engine instance B, the log component 602 can track the user (e.g., via IP address, network address, user name, computer name, etc.), the date and time of security level assignment, the date and time of initiation, details of the security levels, the reasoning for the security assignment, the controller hosting the controller engine instance, etc. Moreover, the log component 602 can store the logged entries in a data store (not shown).

The enhancing component 102 can further utilize a search component 604 that facilitates querying any data associated with the system 600. The search component 604 allows a user and/or any component to query the system 600 in relation to security level and corresponding segments of the industrial environment, separation of control and safety data, back-up controller engine instances, existing controller engine instances, segments, divisions, partitions, membership data, security initiator data (e.g., user/component that employs the security, time, date, reasoning, etc.), controller engine instance data, controller data within the industrial environment, processes, devices, applications, portions of code, etc. For instance, a user can query the system 600 utilizing the search component 604 to find a security level for a specific controller engine instance associated with a particular controller within the Localville, Ohio plant. In another example, the search component 604 can allow a developer/user/entity (e.g., a computer, a machine, a corporation, a group, an individual, a controller, etc.) to provide all variable names associated with devices within sector 5, cell 6, and controlled by controller engine instance C executing on controller A associated with a particular security level and/or a particular back-up technique. It is to be appreciated that a plurality of searches and/or queries can be implemented by the search component 604 and the above examples are not to be limiting on the claimed subject matter. Moreover, it is to be appreciated that the search component 604 is depicted as a stand-alone component, but the search component 604 can be incorporated into the partition component 102, incorporated into a controller, incorporated into a controller engine instance, a stand-alone component, and/or any combination thereof.

The enhancing component 102 can further utilize a bridge component 606 that facilitates networking within an industrial automation environment. In other words, the bridge component 606 can act as a network bridge. It is to be appreciated that the bridge component 606 can be a stand-alone component, incorporated into the enhancing component 102, incorporated into a controller, incorporated into a controller engine instance, and/or any combination thereof. Thus, data carried by disparate networks can be manipulated so that it conforms to a common network. Accordingly, the bridge component 606 can recognize a network protocol associated with received instructions related to the enhancing component 102 and perform operations to convert such data so that it conforms to a pre-defined protocol. Upon such conversion, a mapping can be employed to convert the data so that it conforms to a hierarchically structured data model (rather than data models associated with flat namespaces). The mapping can thereafter provide hierarchically structured data to a requester of such data over a network, wherein the network conforms to the pre-defined protocol. For instance, the first network protocol can be at least one of Fieldbus, Profibus, Hart, Modbus, ASI-bus, and Foundation Fieldbus, while the second network protocol can be a Common Industrial Protocol (CIP). It is to be appreciated that the first network protocol and the second protocol can be both CIP or one be Hart and one be ASI-Bus.

Figure 7:
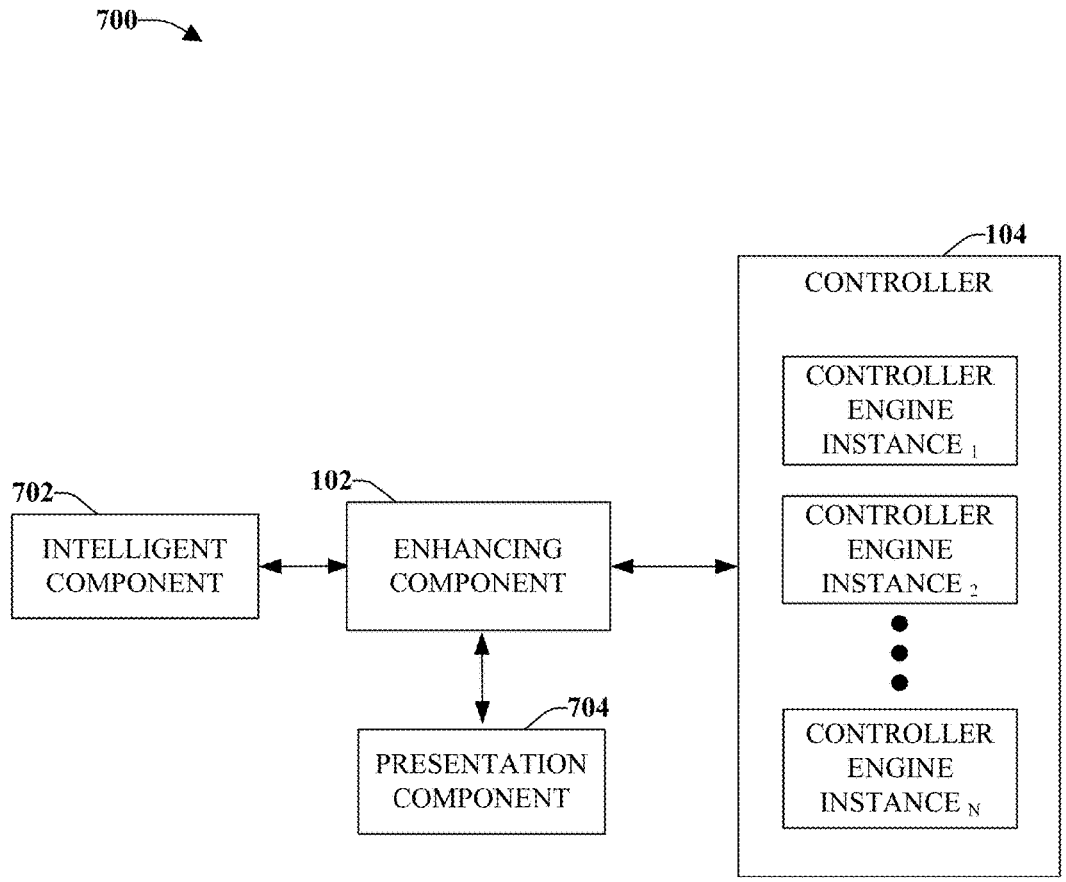
FIG. 7 illustrates a block diagram of an exemplary system that facilitates employing safeguards related to an industrial environment to ensure data integrity and reliability.

FIG. 7 illustrates a system 700 that employs intelligence to facilitate employing safeguards related to an industrial environment to ensure data integrity and reliability. The system 700 can include the enhancing component 102 and the controller 104 with two or more controller engine instances that can all be substantially similar to respective controllers, instances, and components described in previous figures. The system 700 further includes an intelligent component 702. The intelligent component 702 can be utilized by the enhancing component 102 to facilitate employing safeguards to protect at least one of an industrial environment, the controller 104, a controller engine instance, and/or most any suitable combination thereof. For example, the intelligent component 702 can infer security levels, security rights, security association with segments/partitions/groupings, control association, safety association, separation settings, back-up settings, back-up controller engine instance correspondence for existing controller engine instances, etc.

It is to be understood that the intelligent component 702 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, intelligent agents, and probabilistic classification models providing different patterns of independence can be employed. Classification as used herein also is inclusive of statistical regression that is utilized to develop models of priority.

A presentation component 704 can provide various types of user interfaces to facilitate interaction between a user and any component coupled to at least one of the enhancing component 102, the controller 104, and/or a controller engine instance. As depicted, the presentation component 704 is a separate entity that can be utilized with enhancing component 102. However, it is to be appreciated that the presentation component 704 and/or similar view components can be incorporated into the enhancing component 102, a stand-alone unit, and/or most any suitable combination thereof. The presentation component 704 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the enhancing component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels. It is to be further appreciated that the presentation component 704 can utilize bio sensing, biometrics (e.g., fingerprints, retina scan, iris scan, facial patters, hand measurement, etc.), and the like. Moreover, the presentation component 704 can present data to a non-human interfaces such as other machines.

Figure 8:
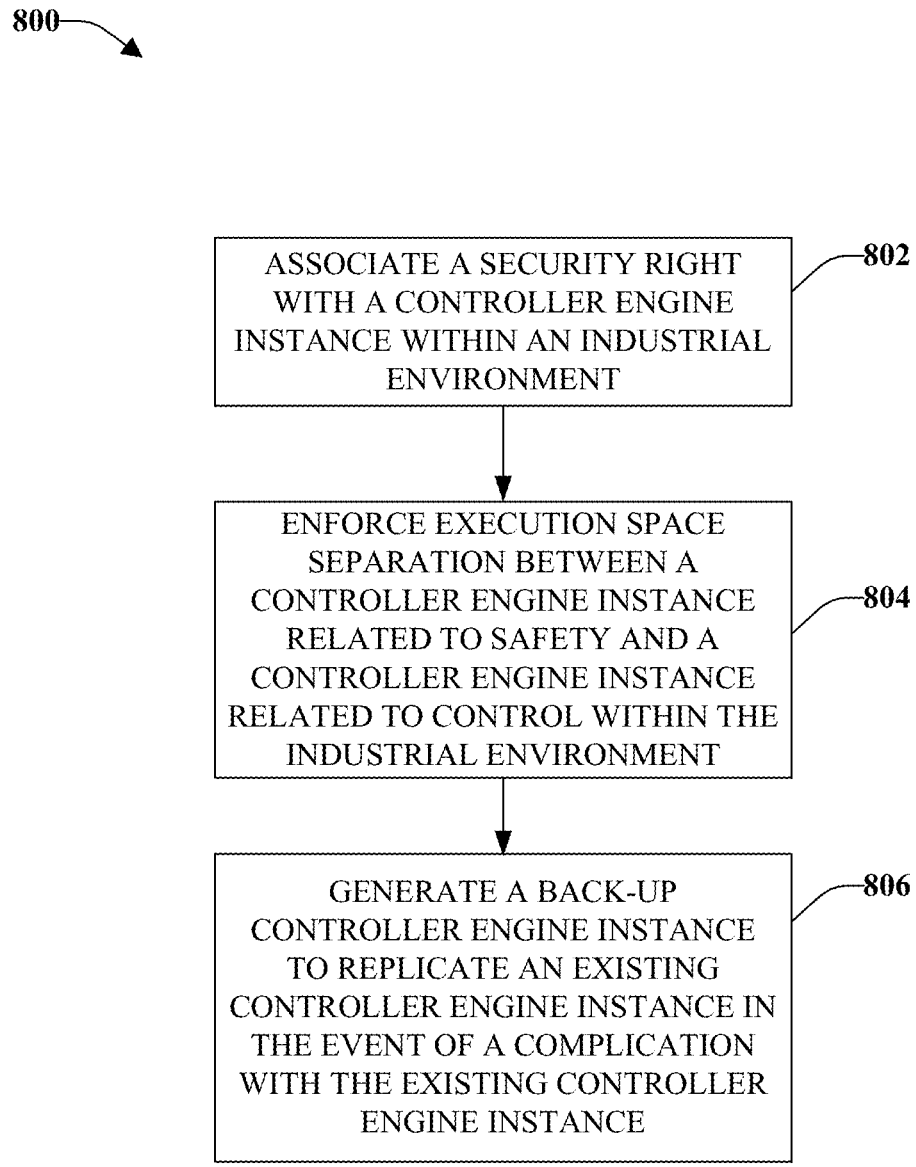
FIG. 8 illustrates an exemplary methodology for protecting an industrial environment utilizing controller engine instances.
Figure 9:
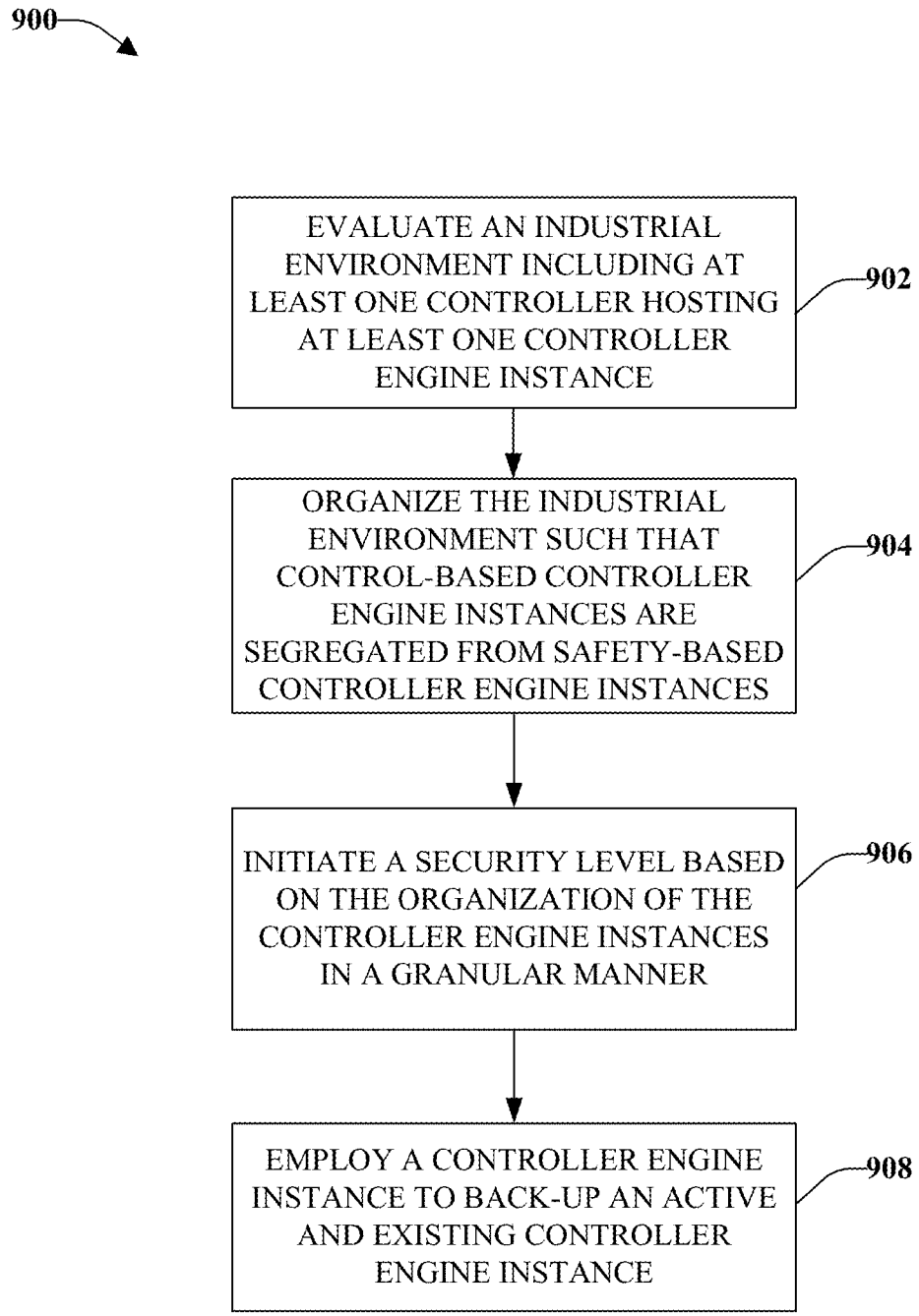
FIG. 9 illustrates an exemplary methodology that facilitates employing safety measures to an industrial environment for security and fail-safe.

Referring to FIGS. 8-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a methodology 800 for protecting an industrial environment utilizing controller engine instances. At reference numeral 802, a security right can be associated with a controller engine instance within an industrial environment. By enabling security rights to be associated with controller engine instances, granular security can be implemented within the industrial environment. A controller can host at least one controller engine instance, wherein the controller can have a real time operating system (OS). It is to be appreciated that the controller can contain software components and hardware components having inputs and/or outputs that can be utilized in connection with automating an industrial manufacturing device/process within the industrial automation environment. Moreover, it is to be appreciated and understood that the controller can be most any suitable portion of hardware and/or portion of software that receives and/or transmits inputs and/or outputs in order to control at least one of a device or a portion of a process. It is to be noted that a controller (e.g., a programmable logic controller (PLC), etc.) can be a dedicated piece of hardware that is self contained or in the case of a "soft PLC" a piece of software that runs on a computer and provides PLC-like control.

Furthermore, the controller can utilize most any suitable number of controller engine instances such as controller engine instance$_1$ to controller engine instance$_N$, where N is a positive integer. Moreover, the claimed subject matter implements a controller engine instance in a substantially similar manner to a process implemented on a hardware controller in the fact that multiple controller engines (e.g., controller engine instance) can execute on the hardware controller (e.g., multiple processes can execute on a controller). It is to be appreciated that the one or more controller engine instances can be executed without user intervention (e.g., in an automatic and seamless manner without human assistance).

At reference numeral 804, separation of execution space can be enforced between a controller engine instance related to safety and a controller engine instance related to control within the industrial environment. It is to be appreciated that entities (e.g., controllers, devices, applications, processes, etc.) associated with control can be segregated from entities associated with safety to provide a clear distinction therewith. Thus, complications related to control and/or safety can be independent of one another. At reference numeral 806, a back-up controller engine instance can be generated to replicate an existing controller engine instance in the event of a complication (e.g., error, exception, mechanical failure, software error, etc.) with the existing controller engine instance. It is to be appreciated that any or all of the methodology 800 (e.g., reference numeral 802, 804, and/or 806) can be executed.

FIG. 9 illustrates a methodology 900 that facilitates employing safety measures to an industrial environment for security and fail-safe. At reference numeral 902, an industrial environment including at least one controller that hosts at least one controller engine instance can be evaluated. The industrial environment (e.g., an industrial environment, an automation environment, an environment, an automation industry, etc.) can employ a hierarchical representation of devices and/or processes, wherein such entities can be evaluated. The hierarchy can be based at least in part upon the physical location of devices/processes (e.g., a region of a factory can have several defined sub-regions, which in turn can comprise sub-regions), standards associated with industry, such as ISA S95, ISA S88, and the like, proprietary hierarchy that is provided by an enterprise, or any other suitable hierarchy. By evaluating the industrial environment, an inventory of such entities and respective details can be identified.

At reference numeral 904, the industrial environment can be organized to segregate a control-based controller engine instance from a safety-based controller engine instance. Such segregation can be based at least in part upon the evaluation of the industrial environment. For example, entities (e.g., controllers, data, code, applications, controller engine instances, devices, hardware components, software components, processes, etc.) within the industrial environment can be organized based on relation to control or safety. At reference numeral 906, a security level with rights and/or privileges can be initiated based at least in part upon the organization of the controller engine instances in a granular manner. For example, a portion of the control-based controller engine instances can include a first security level while a disparate portion of control-based controller engine instances can include a second security level. At reference numeral 908, a controller engine instance can be employed to back-up an active and/or existing controller engine instance. Thus, if an active and/or existing controller engine instance fails and/or throws an error/exception, the back-up controller engine instance can be utilized to dynamically replace such existing controller engine instance. It is to be appreciated that there can be most any suitable number of security levels (e.g., each having distinct rights/privileges) corresponding to portions of the control-based entities and most any suitable number of security levels (e.g., each having distinct rights/privileges) corresponding to portions of the safety-based entities.

At reference numeral 908, a controller engine instance can be employed to back-up an active and/or existing controller engine instance. For example, the industrial environment can include most any suitable number of controller engine instances that can handle and/or control a portion of a device, a portion of a process, a portion of an application, etc. However, in order to ensure a fail-safe and/or contingency plan in the event of a problem (e.g., failure, complications, error, exception, etc.) with a controller engine instance, a back-up controller engine instance can be employed for at least one of the active and/or existing controller engine instance. The back-up controller engine instance can be substantially similar to the existing controller engine instance that it is to back-up. Moreover, the back-up controller engine instance can be executing in the background to allow dynamic implementation upon a problem with the existing controller engine instance. It is to be appreciated that any or all of the methodology 900 (e.g., reference numeral 902, 904, 906, and/or 908) can be executed.

Figure 10:
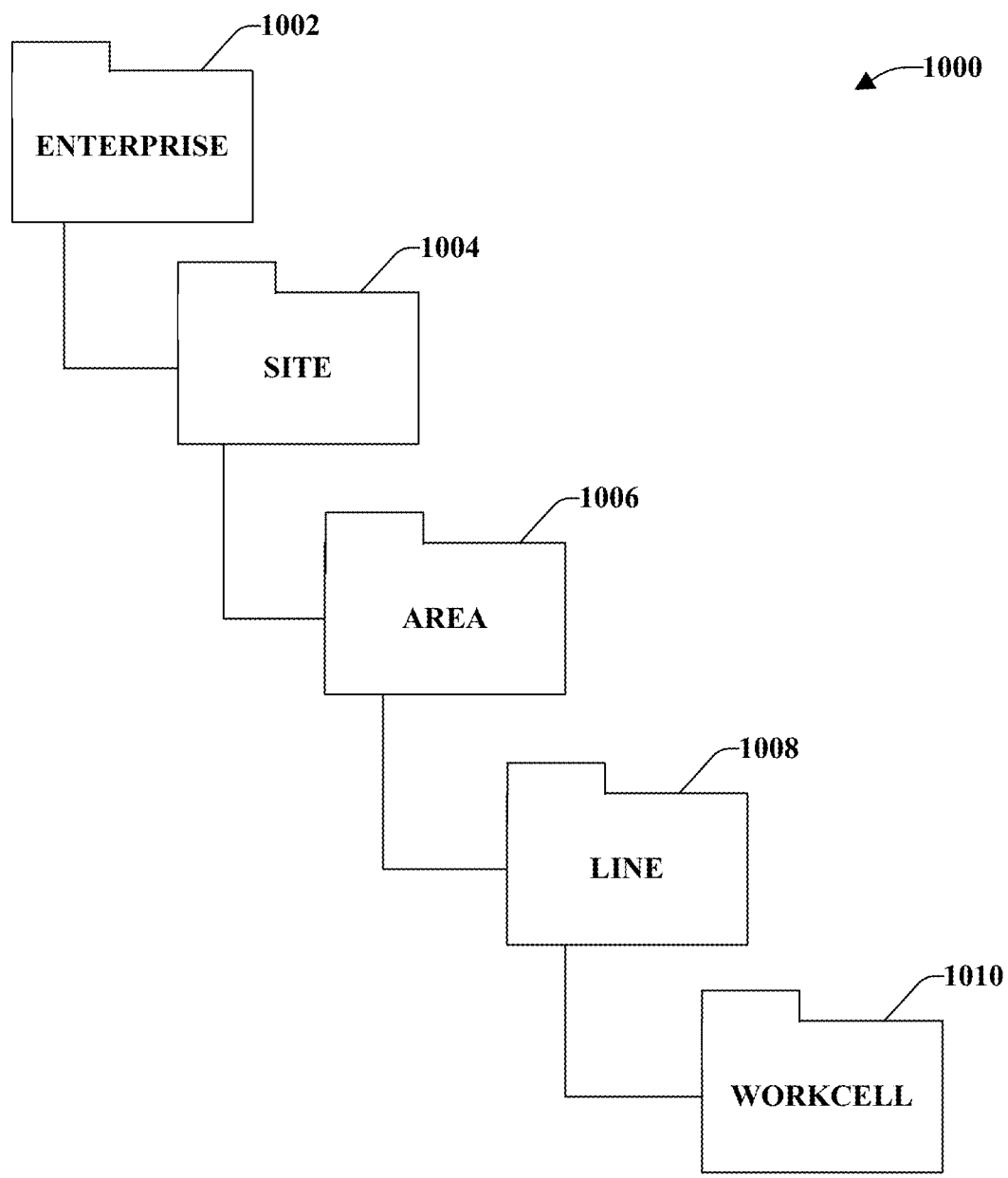
FIG. 10 illustrates a block diagram of an exemplary data structure that represents a hierarchical structure of an industrial automation system.

Referring now to FIG. 10, an exemplary hierarchical structure 1000 which can be utilized in connection with the hierarchically structured data model (e.g., hierarchical representation of devices, processes, etc.) alluded to herein is illustrated. For example, the data model can facilitate utilizing nested structures, thereby mitigating deficiencies associated with data models that employ flat namespaces. The structure 1000 includes an enterprise level 1002, where a particular enterprise can be represented within data structured in accordance with a hierarchical data model. Beneath the enterprise level 1002 can be a site level 1004, so that a particular factory (site) within an enterprise can be represented within a data packet. Beneath the site level 1004 an area level 1006 can exist, which specifies an area within the factory that relates to the data. A line level 1008 can lie beneath the area level 1006, wherein the line level 1008 is indicative of a line associated with particular data. Beneath the line level 1008 a workcell level 1010 can exist, thereby indicating a workcell associated with the data. Utilizing a nested, hierarchical data model, PLCs can become more aware of data associated therewith. Furthermore, the hierarchy 1000 can be customized by an owner of such hierarchy. For instance, more granular objects/levels can be defined within the hierarchy 1000 in relation to the various assets associated therewith. It is to be appreciated that the structure 1000 is for exemplary purposes only and a plurality of levels can be implemented with a multitude of entities can be employed.

Figure 11:
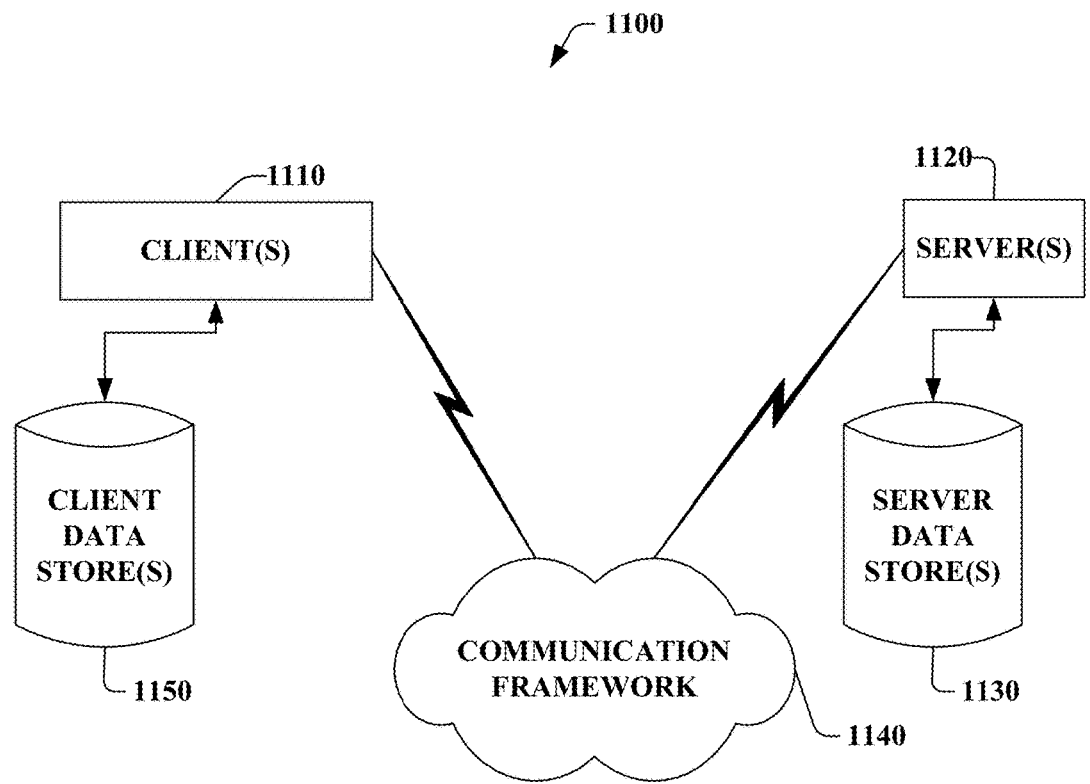
FIG. 11 is an exemplary computing environment that can be utilized in connection with the claimed subject matter.
Figure 12:
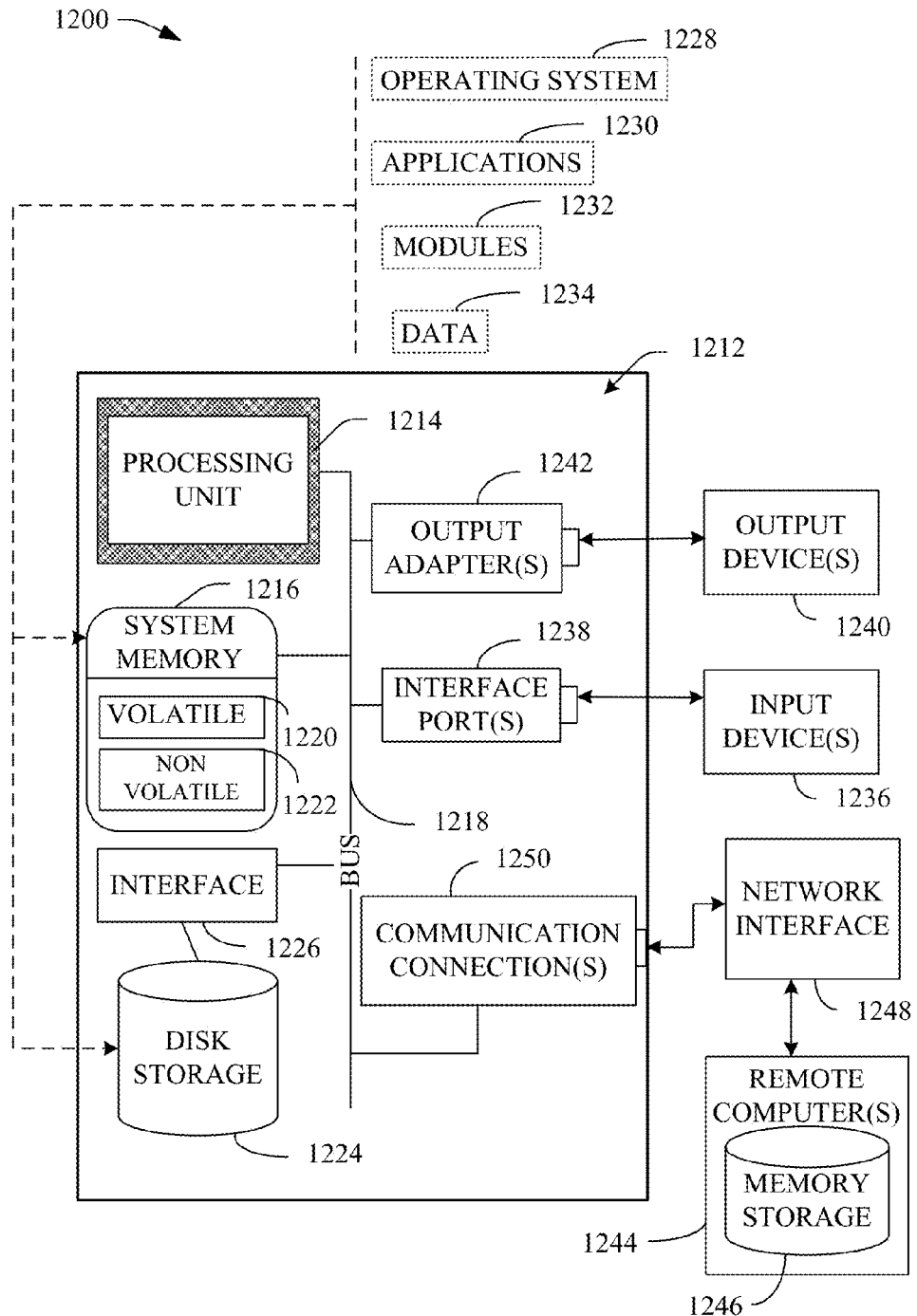
FIG. 12 is an exemplary networking environment that can be utilized in connection with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchronous-link DRAM (SLDRAM), Rambus direct RAM (RDRAM), direct Rambus dynamic RAM (DRDRAM), MRAM, and Rambus dynamic RAM (RDRAM).

Computer 1212 also includes removable/non-removable, volatile/nonvolatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. An industrial controller, comprising:
a memory that stores computer-executable components; and
a processor, operatively coupled to the memory, that executes the computer-executable components, the computer-executable components comprising:
an enhancing component configured to generate a first controller engine instance having a first security level for control of an industrial process and a second controller engine instance having a second security level for control of a safety device; and
a redundancy component configured to generate one or more backup controller engine instances for at least one of the first controller engine instance or the second controller engine instance, wherein the redundancy component determines a quantity of the one or more backup controller engine instances based on ratio data maintained in a data store specifying a ratio of backup controller engine instances to primary controller engine instances.

2. The industrial controller of claim 1, wherein the computer-executable components further comprise a separation component configured to classify the industrial process and the safety device based on an evaluation of industrial data collected from the industrial process and the safety device.

3. The industrial controller of claim 2, wherein the separation component is further configured to segregate execution of the first controller engine instance and the second controller engine instance on respective separate execution spaces.

4. The industrial controller of claim 2, wherein the industrial data comprises a hierarchical representation of devices comprising an industrial environment.

5. The industrial controller of claim 4, wherein the first security level and the second security level correspond to respective first and second safety zones defined by the hierarchical representation.

6. The industrial controller of claim 2, wherein the separation component is further configured to, in response to a determination that the first controller engine instance or the second controller engine instance has failed, initiation one of the one or more backup controller engine instances to replace first controller engine instance or the second controller engine instance.

7. The industrial controller of claim 1, wherein the industrial controller is one of a safety master controller or a safety partner controller.

8. The industrial controller of claim 1, wherein the computer-executable components further comprise a balance component configured to partition a control processing load between a plurality of controller engine instances including the first controller engine instance.

9. The industrial controller of claim 1, wherein the computer-executable components further comprise a query component configured to, in response to receipt of a request, retrieve information identifying one or more processes or devices under control of the first controller engine instance or the second controller engine instance.

10. A method for controlling of an industrial system, comprising:
generating, by a system comprising at least one processor, a first controller engine instance associated with a first security level for control of a first portion of the industrial system relating to process control;
generating, by the system, a second controller engine instance associated with a second security level for control of a second portion of the industrial system relating to safety;
determining, by the system, a quantity of backup controller engine instances to be generated for at least one of the first controller engine instance or the second controller engine instance based on ratio data maintained in a data store that specifies a ratio of backup controller engine instances to primary controller engine instances; and
generating the quantity of backup controller engine instances.

11. The method of claim 10, further comprising evaluating system data collected from the industrial system to identify the first portion of the industrial system and the second portion of the industrial system.

12. The method of claim 11, further comprising executing the first controller engine instance and the second controller engine instance on separate execution spaces of the system.

13. The method of claim 11, wherein the evaluating comprises evaluating, as the industrial data, a hierarchical representation of the industrial system.

14. The method of claim 13, further comprising setting the first security level and the second security level to correspond to respective security levels associated with a first safety zone and a second safety zone defined by the hierarchical representation.

15. The method of claim 10, further comprising:
identifying a failure of at least one of the first controller engine instance or the second controller engine instance; and
replacing the at least one of the first controller engine instance or the second controller engine instance with one of the backup controller engine instances in response to the identifying.

16. The method of claim 10, further comprising partitioning a control processing load between multiple controller engine instances including the first controller engine instance.

17. The method of claim 10, further comprising, in response to receipt of a request, retrieve information from at least one of the first controller engine instance or the second controller engine instance identifying one or more processes or devices being controlled by the at least one of the first controller engine instance or the second controller engine.

18. A non-transitory computer-readable medium having stored thereon instructions that, in response to execution, cause a system comprising a processor to perform operations, the operations comprising:
assigning a first security level to a first controller engine instance configured to control of a first portion of an industrial system relating to process control;
assigning a second security level to a second controller engine instance configured to control of a second portion of the industrial system relating to safety;
determining a quantity of backup controller engine instances to be generated for at least one of the first controller engine instance or the second controller engine instance based on stored ratio data that specifies a ratio of backup controller engine instances to primary controller engine instances; and
generating the quantity of backup controller engine instances.

19. The non-transitory computer-readable medium of claim 18, wherein the operations further comprise identifying the first portion of the industrial system and the second portion of the industrial system based on analysis of industrial data collected from the industrial system.

20. The non-transitory computer-readable medium of claim 18, wherein the operations further comprise executing the first controller engine instance and the second controller engine instance on separate execution spaces of the system.

* * * * *